(12) United States Patent
Kakarlamudi et al.

(10) Patent No.: US 8,930,344 B2
(45) Date of Patent: Jan. 6, 2015

(54) SYSTEMS AND METHODS FOR HOLDING A QUERY

(75) Inventors: Subbarao Kakarlamudi, Milpitas, CA (US); Anan Mahasintunan, San Jose, CA (US); Zbigniew Omanski, San Jose, CA (US); Patrick M. Brown, San Diego, CA (US); Capirala Tharaknath, Austin, TX (US); Arvind Narain, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 13/021,051

(22) Filed: Feb. 4, 2011

(65) Prior Publication Data

US 2012/0203762 A1 Aug. 9, 2012

(51) Int. Cl.
*G06F 7/00* (2006.01)
*G06F 17/30* (2006.01)

(52) U.S. Cl.
CPC .............................. *G06F 17/30463* (2013.01)
USPC ........................... 707/713; 707/718; 707/719

(58) Field of Classification Search
USPC ................... 707/718, 719, 999.005
See application file for complete search history.

(56) References Cited

U.S. PATENT DOCUMENTS

| | | | | |
|---|---|---|---|---|
| 5,442,782 A * | 8/1995 | Malatesta et al. | | 1/1 |
| 5,647,058 A * | 7/1997 | Agrawal et al. | | 1/1 |
| 5,666,528 A * | 9/1997 | Thai | | 1/1 |
| 5,956,706 A * | 9/1999 | Carey et al. | | 1/1 |
| 6,392,126 B1 * | 5/2002 | Mahajan | | 800/295 |
| 6,403,860 B1 * | 6/2002 | Mahajan | | 800/278 |
| 6,438,562 B1 * | 8/2002 | Gupta et al. | | 707/696 |
| 6,657,802 B1 * | 12/2003 | Ashley et al. | | 360/51 |
| 7,072,858 B1 * | 7/2006 | Litzow et al. | | 705/7.35 |
| 7,212,976 B2 * | 5/2007 | Scheer | | 705/7.34 |
| 7,464,088 B1 * | 12/2008 | Chiang | | 1/1 |
| 7,600,154 B2 * | 10/2009 | Appleman et al. | | 714/26 |
| 2003/0158842 A1 * | 8/2003 | Levy et al. | | 707/3 |
| 2003/0167254 A1 * | 9/2003 | Su et al. | | 707/1 |
| 2007/0168329 A1 * | 7/2007 | Haft et al. | | 707/3 |
| 2008/0039071 A1 * | 2/2008 | Pearce et al. | | 455/423 |
| 2008/0133192 A1 * | 6/2008 | Gallagher et al. | | 703/10 |
| 2009/0094192 A1 | 4/2009 | Bestgen et al. | | |
| 2009/0100004 A1 * | 4/2009 | Andrei et al. | | 707/2 |
| 2009/0106321 A1 * | 4/2009 | Das et al. | | 707/200 |
| 2010/0082603 A1 | 4/2010 | Krompass et al. | | |
| 2010/0235349 A1 | 9/2010 | Kuno et al. | | |
| 2011/0047418 A1 * | 2/2011 | Drees et al. | | 714/57 |
| 2011/0313999 A1 * | 12/2011 | Bruno et al. | | 707/718 |

OTHER PUBLICATIONS

Archana, "Predicting and Optimizing System Utilization and Performance via Statistical Machine Learning"; University of California, 2009.*
Bingsheng He et al., "Relational Query Coprocessing on Graphics Processors", ACM 2009.*

(Continued)

*Primary Examiner* — Daniel Kuddus (57) ABSTRACT

A database management system that can comprise a memory for storing computer executable instructions and a processing unit for accessing the memory and executing the computer executable instructions. The computer executable instruction scan comprise a compiler to hold a query received at a query input, thereby preventing the query from executing based on a cost comparison between an estimated resource execution cost of a query plan for the query and cost rules.

21 Claims, 5 Drawing Sheets

(56) References Cited

OTHER PUBLICATIONS

Banerjee et al., "DBC—A Darabase Computer for Very Large Databases". IEEE 1979.*

Warshaw et al., "Rule-Based Query Optimization, Revisited", ACM 1999.*

Warshaw et al., Rule-Based Query Optimization, Revisited; ACM 1999.*

* cited by examiner

SYSTEMS AND METHODS FOR HOLDING A QUERY

BACKGROUND

Relational database systems store tables of data which are typically linked together by relationships that simplify the storage of data and make queries of the data more efficient. Structured Query Language (SQL) is a standardized language for creating and operating on relational databases.

One operation in SQL is the query, which retrieves data from a table or an expression. Some query statements have no persistent effects on a queried database. However, some queries can have persistent effects. Moreover, some queries can retrieve so many different records in a database that the query is executed on the database for an excessive amount of time and/or utilizes an unreasonably large amount of computer processing resources. Such a query can be referred to as a runaway query.

DETAILED DESCRIPTION

Figure 1:
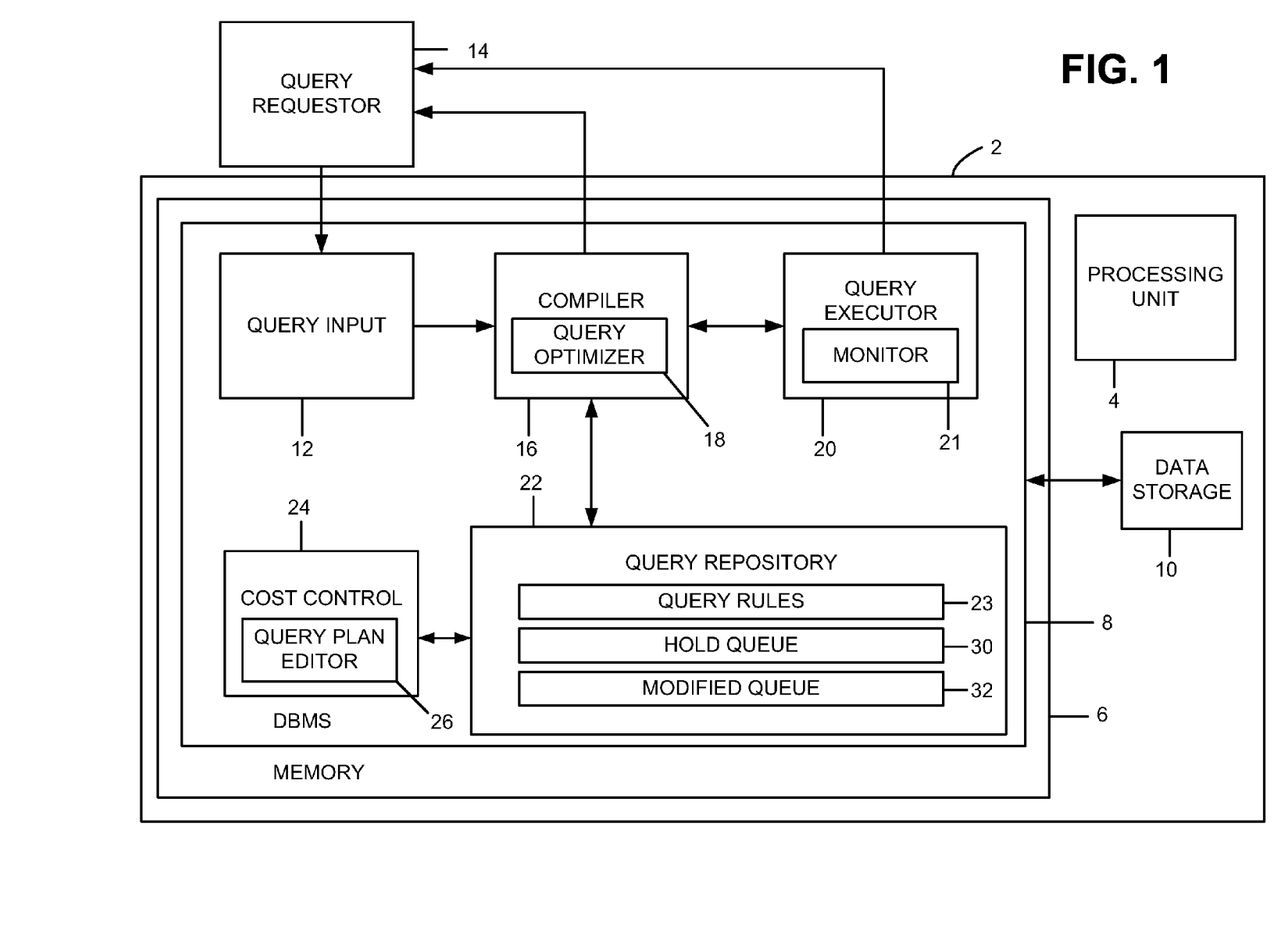
FIG. 1 illustrates an example of a database management system.

FIG. 1 illustrates an example schematic block diagram of a system 2 for managing a database. The system 2 can determine whether to hold a query on a database, such as based on a cost comparison between an estimated resource execution cost of a query plan for the given query and cost rules. The system 2, by holding the query, can prevent the query from being executed. As an example, the system can be utilized to hold a runaway query. A runaway query is a query that requires an excessive amount of execution resources for completion, thereby monopolizing a database management system.

Where the disclosure or claims recite "a," "an," "a first," or "another" element, or the equivalent thereof, it should be interpreted to include one or more than one such element, neither requiring nor excluding two or more such elements. The system 2 can include a processing unit 4 and a memory 6. The memory 6 can be employed to store data and computer executable instructions. The processing unit 4 can access the memory 6 and execute the computer executable instructions. The processing unit 4 can include a processing core. The memory 6 can be implemented as a computer readable medium, such as random access memory (RAM), non-volatile memory, and the like.

The memory 6 can include a database management system (DBMS) 8 that accesses a database stored in data storage 10. The data storage 10 could be implemented, for example as a computer readable medium, such as a hard disk system, a solid state drive system, random access memory (volatile or non-volatile), and the like. The database can be implemented, for example, as a relational database that can be queried using Structured Query Language (SQL), XQuery, and the like.

For purposes of simplification of explanation, in the present example, different components of the DBMS 8 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit, or as a combination of both (e.g., firmware). The DBMS 8 can include a query input 12 (e.g., a queue) that receives a query from a query requestor 14. The query requestor 14 could be, for example, a system external to the DBMS 8 and/or the system 2, such as an application executing on another computer. For instance, the query requestor 14 could be implemented as a web browser. As one example, the received query can be implemented as SQL relational logic that includes relational operators and/or predicates and literals/constants that define the selectivity of the predicates and/or the relational operators.

The received query can be provided from the query input 12 to a compiler 16 of the DBMS 8. A query optimizer 18 of the compiler 16 can employ heuristics to generate a query plan for the received query. The query optimizer 18 can attempt to determine an efficient way to execute a query. The query optimizer 18 can consider the possible query plans for the received query and attempt to determine which of those plans will be the most efficient. As one example, cost-based query optimizers can assign an estimated "cost" to each possible query plan, and choose the plan with the smallest cost. Costs are used to estimate the runtime cost of evaluating the query, in terms of the number of I/O operations required, the CPU requirements, and the like. The set of query plans examined is formed by examining the possible access paths (e.g. index scan, sequential scan) and join algorithms (e.g. sort-merge join, hash join, nested loop join). The query plan generated by the query optimizer 18 can be implemented, for example, as an ordered set of steps used to access or modify information in the database. Additionally, in some examples, the query plan can include control information that can dictate when/how the query plan is executed. For instance, a particularly complex query plan can be programmed to be executed during off-peak hours and/or with a low priority. In this manner, the query plan can be employed by a query executor 20 to execute the received query on the database.

The query optimizer 18 can also generate an estimated resource execution cost for executing a query plan based on the received query. The estimated resource execution cost can be based, for example on estimated cost fields. Examples of the estimated cost fields can include an estimated number of processes required to execute the query plan, an estimated processing time for each required process, an estimated number of processing cores to execute each required process, and the like. The estimated execution cost can be based, for example, on the number of join and/or cross product operations.

The estimated resource execution cost can be compared, by the compiler 16 to cost rules 23 stored in a query repository 22 in a cost comparison operation. The cost rules 23 can include, for example, threshold levels corresponding to estimated cost fields of the estimated resource execution cost, which threshold levels can be set by a cost control 24 of the DBMS 8. Thus, the cost rules 23 can characterize a resource execution cost limit for a query plan. The compiler 16 can perform the cost comparison between the estimated resource execution cost and the cost rules 23 to determine if the estimated resource execution cost exceeds the cost rules 23, such as in a manner described herein. The cost control 24 can be implemented, for example, to provide a user (e.g., a database administrator) with an interface (such as a graphical user interface) for adjusting the cost rules 23 based on the performance characteristics of the DBMS 8.

Figure 2:
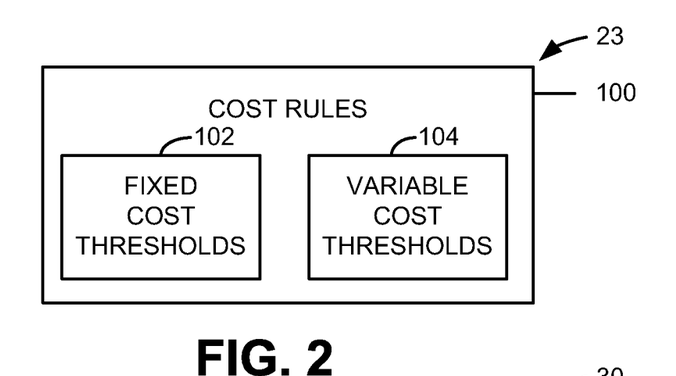
FIG. 2 illustrates an example of cost rules.

FIG. 2 illustrates an example of cost rules 100 such as the cost rules 23 of FIG. 1. Threshold levels of the cost rules 100 can be tagged (or labeled) to indicate "FIXED" 102 or "VARIABLE" 104. A threshold level with a tag indicating FIXED can be referred to as a fixed cost threshold 102 that can be employed to set a hard cap limit on resources allocated for a corresponding estimated cost field. Alternatively, a threshold level with a tag indicating a status of VARIABLE can be referred to as a variable cost threshold 104. A variable cost threshold 104 can set a soft cap limit on resources allocated for a corresponding estimated cost field. The fixed cost threshold 102 and the variable cost threshold 104 can be adjusted by the user via the cost control 24.

Referring back to FIG. 1, in one example, during the cost comparison, if any of the estimated execution cost fields exceeds a level defined by a corresponding threshold level of the rule set that is tagged to indicate FIXED, the received query can be set with a status indicative of "HOLD" which can indicate that the query is being held, thereby preventing the query from being executed. Additionally or alternatively if, during the cost comparison, an estimated cost field exceeds a corresponding variable cost threshold by a predetermined amount (e.g., 10%), the execution of the query plan can also be discontinued (e.g., canceled). The received query can also be set with a status indicative of HOLD. Moreover, if the received query is set with a status indicating HOLD, the compiler 16 can provide a message to the query requestor 14 indicating that the received query has been put in a hold status.

In a situation where in the cost comparison indicates the estimated execution cost fields do not exceed a fixed cost threshold level or a variable cost threshold level, the received query can be set with a status of "EXECUTE" and the generated query plan can be provided to a query executor 20. The query executor 20 can execute a query based on the query plan.

During execution of the query plan, the query executor 20 can include a monitor 21 that can monitor the query executor's 20 actual resource execution cost and the query executor 20 can perform a cost comparison between the actual resource execution cost and the cost rules 23. The query executor 16 can perform the cost comparison between the actual resource execution cost and the cost rules 23 to determine if the actual resource execution cost exceeds the cost rules 23, in a manner described herein. For example, the actual resource execution cost can be implemented to have actual execution cost fields that can include an observed number of processes required to execute the query plan, an observed processing time for each required process, an observed number of processing cores to execute each required process, and the like. If, during the cost comparison, the query executor 20 determines that an actual cost field exceeds a corresponding fixed cost threshold, the query executor 20 can discontinue (e.g., cancel) the execution of the query plan and the received query can be set with a status indicating HOLD. Additionally or alternatively, if, during the cost comparison, an actual cost field exceeds a variable cost threshold by a predetermined amount (e.g., 10%), the execution of the query plan can also be discontinued (e.g., canceled) and the received query can be set with a status indicating HOLD. The query executor 20 can also provide a notification to the query requestor 14 that the received query has been given a status indicating HOLD. Moreover, in some examples, the monitor 21 can perform the cost comparison between the actual resource execution cost of the query plan and the cost rules 23 and/or the aforementioned cost comparison between estimated resource execution cost of the query plan and the cost rules 23.

Figure 3:
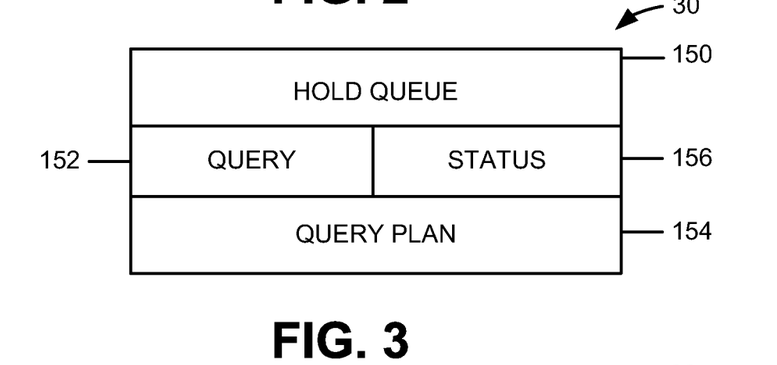
FIG. 3 illustrates an example of an entry in a hold queue.

Furthermore, if the received query has been given a status indicating HOLD, the received query, along with the generated query plan for the received query can be added to a hold queue 30 of the query repository 22. An example of an entry 150 in the hold queue 30 is illustrated in FIG. 3. In one example, the entry 150 in the hold queue 30 can include a query 152, a query plan 154 for executing the query 152 and a status 156 of the query 152. In the present example, the status of the query can be set to a value indicating HOLD.

Referring back to FIG. 1, the hold queue 30 can be managed by the user of the cost control 24. In one example, the user of the cost control can be notified when an entry is added to the hold queue 30. Moreover, the user of the cost control 24 can examine an entry in the hold queue 30 (such as the entry 150 illustrated in FIG. 3). In such a situation, the user can employ a query plan editor 26 of the cost control 24 to modify operations in the query plan of the examined entry of the hold queue 30 in a manner that would likely reduce the resource execution cost of the query plan of the examined entry. The query plan editor 26 can be implemented, for example, as including a text editor and/or a graphical user interface. For example (via the query plan editor 26), operations such as a hybrid-hash join in the query plan could be changed to an ordinary join operation. As another example, a condition cap that can limit the number of conditional statements in the query plan can be implemented. Additionally or alternatively, the query plan of the examined entry could be modified to employ less memory and/or fewer processes. Moreover, the user can set/change a status for the query of the examined entry. As one example, the status of the query of the examined entry can be set to a status indicating "RESUBMIT" which can indicate that that the examined entry, which may be the same as or an adjusted version of the original received query, can be resubmitted to the compiler 16.

In other examples, the user may determined that no significant resource execution costs can be saved by modifying the operations in the query plan of the examined entry, but that the query of the examined entry still needs to be executed. In such a situation, the user can modify the query plan of the examined entry to be executed during a period known for having a low utilization rate of the DBMS 8, such as overnight. Additionally or alternatively, the user can modify the query plan of the examined entry such that the query plan of the examined entry is executed with a low priority, such that other query plans can be executed concurrently with the query plan of the examined entry. As yet another example, the user might determine that execution of the query of the examined entry is of a high importance, wherein no changes are made to the query plan. In these situations, the status of the query plan can be set to indicate "FORCE" which would indicate that the entry will be forced to be executed by the compiler 16, even if a cost field (estimated or actual) of a resource execution of the query plan of the examined entry would exceed a threshold level set in the fixed and variable cost thresholds of the cost rules 23.

In still other examples, the user may determine that no significant resource execution costs can be saved by modifying the operations and that the query of the examined entry does not need to be executed. For instance, some queries can be formed with nested operations that could cause the query executor 20 to enter an infinite loop, such that the query will never be completed no matter how much of the available resources are allocated to the query. In other situations, some query plans can be configured to include join functions that are so complicated that the amount of data likely returned from a query based on the query plan is so large that it would be virtually unusable. In these situations, the user can opt to not modify the query plan of the examined entry, and set the status of the entry to a value indicating "REJECTED" which could indicate that the query of the examined entry will not be executed, thereby preventing the query of the examined entry from being executed.

Figure 4:
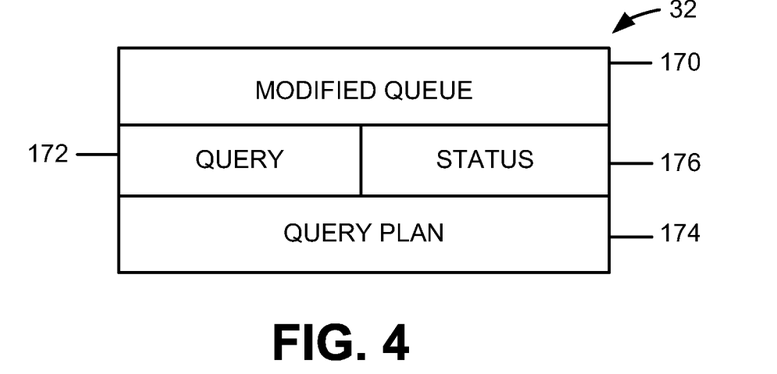
FIG. 4 illustrates an example of an entry in a modified queue.

Upon setting the status of the query of the examined entry, the query of the examined entry, the status and the corresponding modified query plan can be added as an entry to a modified queue 32 of the query repository 22. FIG. 4 illustrates an example of an entry 170 in the modified queue 32. The entry 170 in the modified queue 32 can include, for example a query 172, a query plan 174 for executing the query 172, along with an associated status 176 for the query 172.

Referring back to FIG. 1, the compiler 16 can access the modified queue 32 to retrieve an entry. If the retrieved entry has a value indicating REJECTED, the compiler 16 can notify the query requestor 14 of the retrieved entry that the query will not be executed. In such a situation, the notification can include information that can assist the query requestor 14 in re-drafting a query. For instance, the notification can include information that characterizes reasons for rejecting the query (e.g., too many join statements), such that the query can be rewritten and resubmitted in a different form. If the retrieved entry has a value indicating FORCE, the modified query plan of the retrieved entry can be provided to the query executor 20. The query executor 20 can execute the modified query plan based on the parameters set by the user (e.g., execution time, priority, and the like).

If the retrieved query plan has a value indicating RESUBMIT, the compiler 16 can estimate the resource execution cost for executing the modified query plan of the retrieved entry. The estimated resource execution for the modified query plan of the retrieved entry can be similar to the estimated resource execution cost for the (unmodified) query plan generated for the received query. The compiler 16 can perform a cost comparison between the estimated execution resource cost and the cost rules 23 to determine if the estimated execution resource cost exceeds the cost rules 23, as described herein. For example, during the cost comparison, estimated cost fields of the estimated resource execution cost for the modified query of the retrieved entry can be compared against the fixed and variable cost thresholds of the cost rules 23 to determine whether the resource execution cost falls below the fixed and variable cost thresholds of the cost rules 23. If an estimated cost field of the estimated resource execution cost for the modified query plan of the retrieved entry exceeds a corresponding fixed cost threshold of the cost rules 23, or if an estimated cost field of the estimated resource execution cost for the modified query plan of the retrieved entry exceeds a variable cost threshold of the cost rules 23 by a predetermined amount, the status of the retrieved entry can be set to a value indicating REJECTED. Alternatively, if the estimated cost fields for the modified query of the retrieved entry do not exceed fixed and variable cost thresholds of the cost rules 23, the status of the retrieved entry can be set to a value of EXECUTE, wherein the modified query plan of the retrieved entry can be executed by the query executor 20.

During execution of the modified query plan of the retrieved entry, the monitor 21 of the query executor 20 can monitor the actual resource execution cost of the query plan of the retrieved entry. A cost comparison between the actual execution resource cost and the cost rules 23 can be performed by the query executor 20 to determine if the estimated execution resource cost exceeds the cost rules 23, as described herein. Moreover, in some examples, the monitor 21 can perform the cost comparison between the actual resource execution cost of the query plan of the retrieved entry and the cost rules 23 and/or the aforementioned cost comparison between the estimated resource execution cost of the modified query plan of the retrieved entry and the cost rules 23.

The actual resource execution cost of the retrieved entry can be implemented to have actual execution cost fields similar to those actual cost fields observed for the (unmodified) query plan generated for the received query. For instance, if, during the cost comparison, an actual cost field exceeds a fixed cost threshold, the query executor 20 can discontinue (e.g., cancel) execution of the query plan and set the status for the retrieved entry set to a status value indicating REJECTED. Additionally or alternatively, if an actual cost field exceeds a variable cost threshold by a predetermined amount (e.g., 10%), the query executor 20 can also discontinue (e.g., cancel) execution of the query plan and the received query can be set with a status value indicating REJECTED. Moreover, the query executor 20 can provide a notification (e.g., a rejection notification) to the query requestor 14 that the query of the retrieved entry will not be executed. Additionally or alternatively, the notification can also be sent to another recipient (e.g., a user of the cost control 26). In such a situation, the notification can include information (e.g., reasons for providing the notification) that can assist the query requestor 14 and/or the user of the cost control 26 in re-drafting a query.

Furthermore, the compiler 16 can be configured to improve its estimations of resource execution cost. As one example, the compiler 16 can receive feedback from the query executor 20 to compare the compiler's 16 estimated query execution cost with actual execution costs received from the query executor 20. Moreover, the compiler 16 can also be configured to employ data stored in the query repository 22 to modify query plan generation heuristics of the query optimizer 18 based on observed modifications to the query plans retrieved from the modified queue 32.

For example, if query plans are continually modified (by the user of the cost control 24) to change a hash-join operation to a normal join operation, the heuristics of the query optimizer 18 can be changed so as to limit the instances where the query optimizer 18 implements a hash-join in a query plan. Additionally, the compiler 16 can be programmed such that if a query plan generated for a received query is similar to a query repository 22 stored in the query repository 22 with a status value indicating REJECTED or HOLD, the received query can be set to a value indicating REJECTED or HOLD in a similar manner, such that no further execution resources are wasted by attempting to execute the received query before the received query is modified.

By employing the DBMS 8, runaway queries, namely queries that require an excessive amount of execution resources for completion, thereby monopolizing the DBMS 8, can be modified and/or canceled. In particular, since such a runaway query can be set to have a status value indicating HOLD based on an estimated query execution cost, wasteful execution of runaway queries can be mitigated and/or prevented. Furthermore, since the query requestor 14, or use of a runaway query (or other use, such as a database administrator) is notified that a received query has been set to a status value indicating HOLD or REJECTED, the query requestor 14 is less likely to resubmit the query without modification. Furthermore, as noted, even if the query is resubmitted, the compiler 16 and the query optimizer 18 can be programmed to generate more cost efficient query plans (based on analysis of modification data for previously modified query plans) and/or to detect the resubmitted query, and set it to a status value indicating HOLD or REJECTED. In this manner significant resource execution costs can be saved and allocated more efficiently.

Figure 5A:
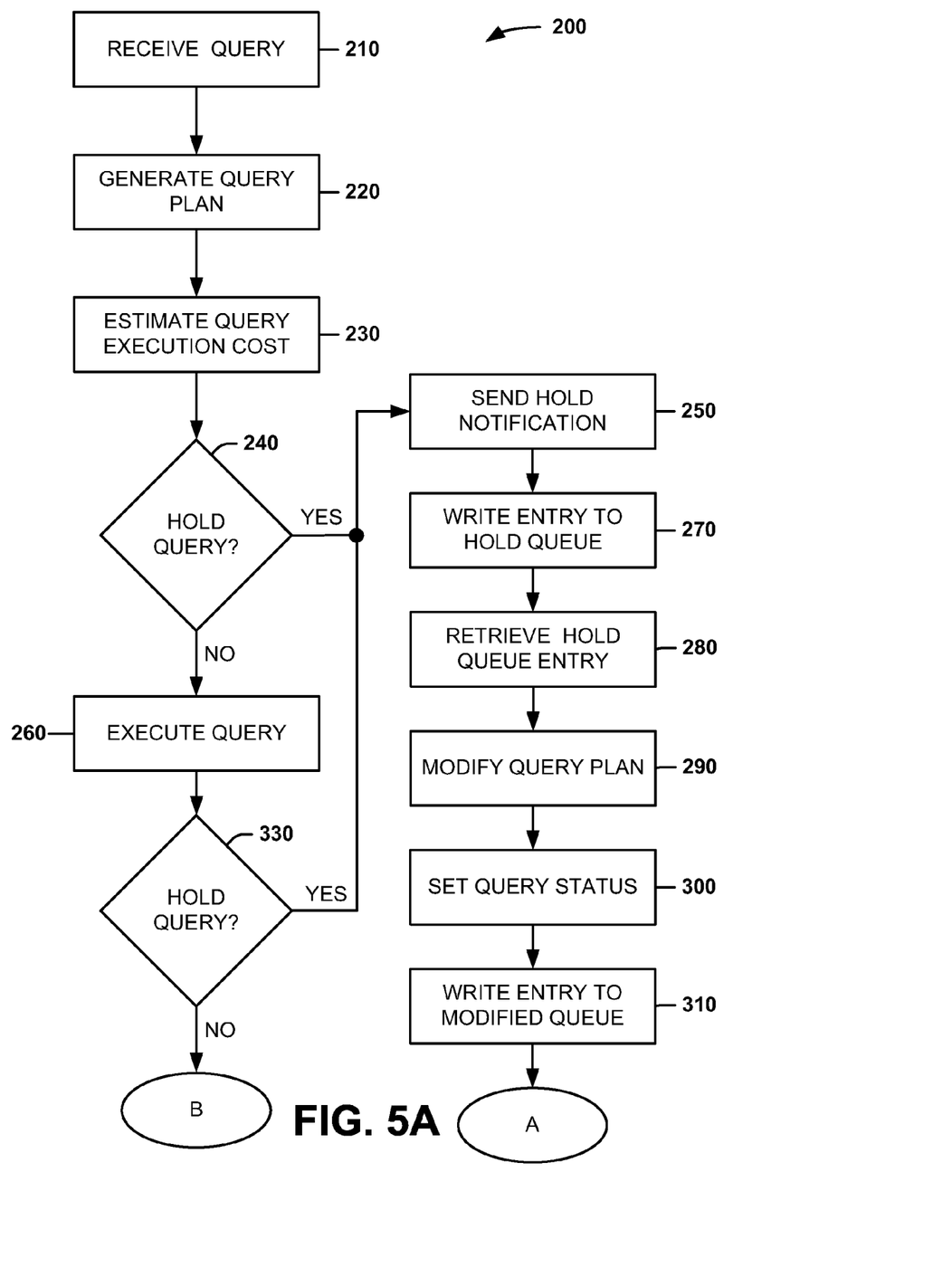
FIGS. 5A and 5B illustrate a flowchart of an example method for managing a database system.
Figure 5B:
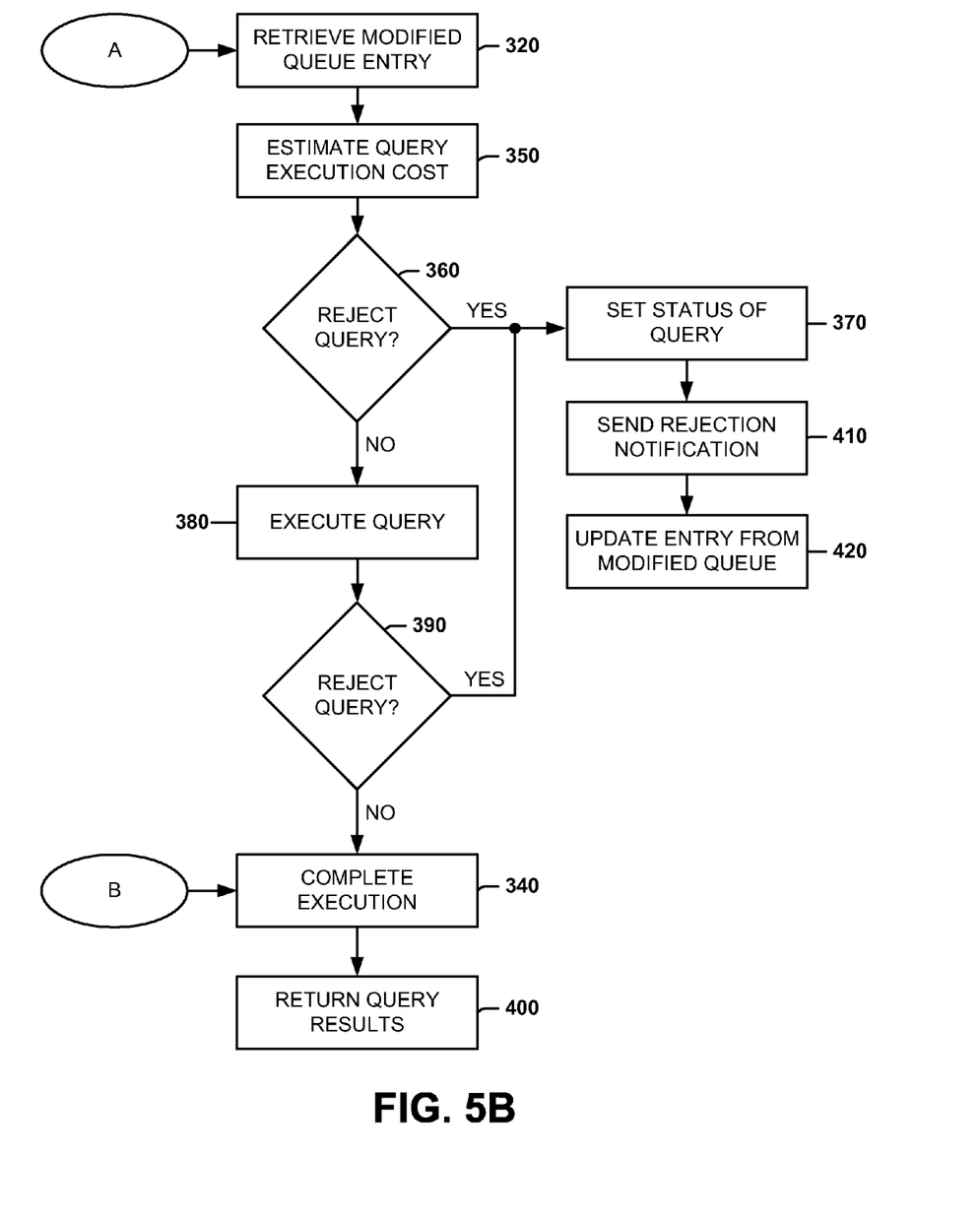
Figure 6:
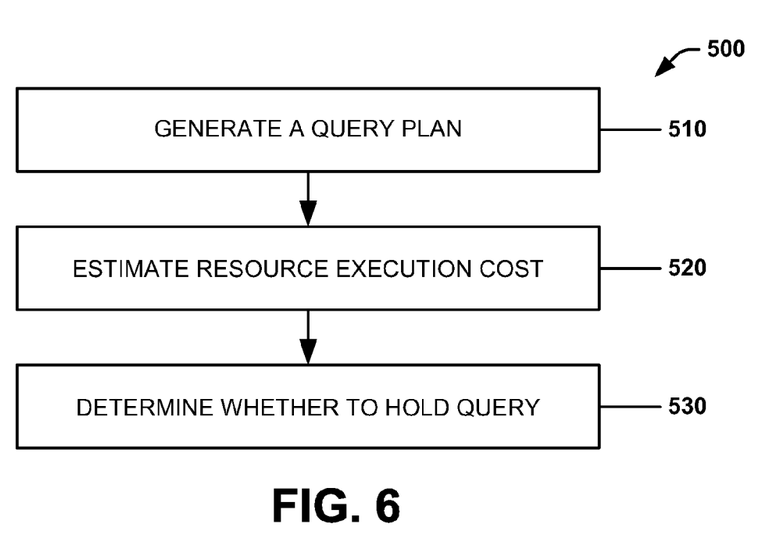
FIG. 6 illustrates another example of a flowchart of a method for managing a database system.

In view of the foregoing structural and functional features described above, example methodologies will be better appreciated with reference to FIGS. 5-7. While, for purposes of simplicity of explanation, the example methods of FIGS. 5-7 are shown and described as executing serially, it is to be understood and appreciated that the present examples are not limited by the illustrated order, as some actions could in other examples occur in different orders and/or concurrently from that shown and described herein.

FIGS. 5A and 5B illustrate a flow chart of an example method 200 for managing a database. The method 200 could be executed, for example, by a DBMS (e.g., the DBMS 8 of FIG. 1). At 210, a query for a relational database can be received, for example, at a compiler of the DBMS (e.g., the compiler 16 of FIG. 1). The query can be received, for example, at a query input (e.g., the query input 12 of FIG. 1) of the DBMS and forwarded to the compiler of the DBMS. The query can be provided, for example, by a query requestor (e.g., the query requestor 14 of FIG. 1), which could be implemented, by an external application, such as a web browser operating on a computer external to the DBMS. At 220, a query plan for the received query can be generated by a query optimizer of the compiler (e.g. they query optimizer 18 of FIG. 1). To generate the query plan, the compiler can employ a query optimizer that utilizes heuristics to determine a query plan that has a lowest estimated execution cost. At 230, the execution cost for the generated query plan can be estimated by the compiler. The estimated execution cost can include, for example, estimated cost fields, as described herein.

At 240, a determination can be made as to whether to hold the received query at the compiler (e.g., the compiler 16 of FIG. 1). The determination can be based, for example, on a cost comparison between the estimated query execution cost and cost rules. If the compiler determines that an estimated cost field of the estimated execution cost for the generated query exceeds a fixed cost threshold of the cost rules or if the compiler determines that an estimated cost field of the estimated execution cost for the generated query exceeds a variable cost threshold by a predetermined amount, the determination at 240 can be positive (e.g., YES) which indicates that the received query should be held, and the method 200 can proceed to 250. If the cost comparison indicates that the estimated cost fields of the generated query are below the fixed and variable cost thresholds (or are above the variable cost thresholds by less than the predetermined amount), the determination at 240 can be negative (e.g., NO), and the method 200 can proceed to 260.

At 250, a hold notification can be sent. For instance, the query requestor (e.g., the query requestor 14 of FIG. 1) can be notified that the received query has been given a status indicating HOLD. Additionally or alternatively, a user, such as a database administrator can be sent the notification, and in response to which can take corrective action, as deemed appropriate. At 270, the query, a status for the query is set to a value indicative of HOLD, and an entry including the query, the query plan and the query status can be written to a hold queue of the query repository (e.g., the hold queue 30 of FIG. 1). At 280, an entry of the hold queue can be retrieved at the cost control (e.g., the cost control 24 of FIG. 1). At 290, a user of the DBMS can modify the query plan with a query plan editor (e.g., the query plan editor 26 of FIG. 1) of the cost control. The modifications to the query plan of the retrieved entry can attempt to reduce the execution cost of the query plan. At 300, a query status of the retrieved entry in the hold queue can be set by the user. The setting can be based, for example on the modifications of the query plan of the retrieved entry. For instance, if the operations of the query plan of the retrieved entry were modified, the query status can be set to a value indicating RESUBMIT. Alternatively, if the priority and/or the time of execution defined in the query plan are changed, the query status can be set to a value indicating FORCE. As another alternative, if the user decides that the execution cost of the query plan cannot be reduced significantly, the query status can be set to a value of REJECT. At 310, the modified query plan, the query from the entry retrieved from the hold queue and the status set by user of the cost control can be written into an entry of a modified queue, and the method can proceed to 320.

At 260, the generated query plan can be executed on the relational database, for example, by a query executor (e.g., the query executor 20 of FIG. 1). At 330, another determination can be made by the query executor as to whether or not to hold the received query. The determination can be based on an actual cost comparison of actual (observed) execution cost fields with fixed and variable cost thresholds of the cost rules in a manner similar to the estimated cost comparison performed at 240. If the determination at 330 is positive (e.g., YES), the method 200 can proceed to 250. If the determination at 330 is negative (e.g., NO), the method can proceed to 340.

At 320, an entry can be retrieved by the compiler (e.g., the compiler 16 of FIG. 1) from a modified queue (e.g., the modified queue 32 of FIG. 1). At 350, a resource execution cost for the modified query plan stored in the entry retrieved from the modified queue can be estimated by the compiler. At 360, a determination is made at the compiler as to whether to reject the query from the entry retrieved from the modified queue. The determination at 360 can be based on a status of the entry retrieved from the modified queue and on a cost comparison of the estimated resource execution cost of the modified query plan and the cost rules. For instance, the query can be rejected, for example, if (i) the entry retrieved from the modified queue has a status value indicating REJECTED or (ii) if a cost comparison with the estimated resource execution cost for the modified query plan of the entry retrieved from the modified queue indicates that the estimated execution cost for executing the query plan will exceed a fixed cost threshold of the cost rules or exceed a variable cost threshold by more than the predetermined amount. The query can be accepted (e.g., not rejected), for example, if (i) the entry retrieved from the modified queue has a status value indicating FORCE or (ii) the cost comparison with the estimated resource execution cost for the modified query plan of the entry retrieved from the modified queue indicates that the execution cost for executing the query plan will not exceed a fixed cost threshold of the cost rules and will not exceed a variable cost threshold of the cost rules by more than the predetermined amount. If the determination at 360 is positive (e.g., YES), the method 200 can proceed to 370. If the determination at 360 is negative, (e.g., NO), the method 200 can proceed to 380.

At 380, the modified query plan from the entry retrieved from the modified queue can be executed by the query executor (e.g., the query executor 20 of FIG. 1). During execution of the modified query plan, a determination at 390 can be made as to whether to reject the query plan. The determination at 390 can be based on a status of the entry retrieved from the modified queue and a cost comparison of an actual resource execution cost and the cost rules as described herein. If the determination at 390 is positive (e.g., YES), the method 200 can proceed to 370. If the determination at 360 is negative (e.g., NO), the method 200 can proceed to 340.

At 340 execution of the query plan is completed by the query executor (e.g., the query executor 20 of FIG. 1), and the method 200 can proceed to 400. At 400 results of the query can be returned the query requestor.

At 370, the status of the entry retrieved from the modified queue can be set to a value indicating REJECTED. At 410, a rejection notification can be sent. The rejection notification can be sent, for example to the query requestor (e.g., the query requestor 14 of FIG. 1), wherein the rejection notification indicates that query from the entry retrieved from the modified queue has been rejected. The rejection notification can include information, such as the reasons for rejection that can assist the query requestor and/or the user of the cost control in reforming the query of the entry retrieved from the modified queue. Additionally or alternatively, the rejection notification can be sent to a user of the cost control (e.g., the cost control 23 of FIG. 1). At 420, the entry retrieved from the modified queue can be updated.

By utilization of the method 200, execution of runaway queries can be avoided and/or mitigated. In this manner, execution resources of the DBMS can be more efficiently allocated. Furthermore, since a query requestor is notified that a query has been given a status indicating HOLD or REJECTED, the likelihood that the query will be repeated in unmodified form can be mitigated.

FIG. 6 illustrates another flowchart of an example method 500 for managing a database. At 510 a query plan for a received query can be generated (e.g., by a query optimizer). At 520 a resource execution cost of the query plan can be estimated (e.g., by a compiler). At 530 a determination (e.g., by the compiler) can be made as to whether to hold the received query based on the estimated resource execution cost of the query plan. Holding of the received query can prevent execution of the query plan.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A database management system (DBMS) comprising:
a memory for storing computer executable instructions; and
a processing unit for accessing the memory and executing the computer executable instructions, the computer executable instructions comprising:
a query optimizer to:
generate a query plan for a query received at a query input; and
determine an estimated resource execution cost of the query plan, the estimated resource execution cost comprises a plurality of estimated cost fields;
a compiler to hold the query the holding prevents the query from executing based on a determination that the estimated resource execution cost of the query plan exceeds at least one of a plurality of cost rules, wherein the estimated resource execution cost is based on at least one of a number of join operations and a number of cross product operations in the query plan for executing the query;
wherein the cost rules comprise:
a fixed cost threshold; and
a variable cost threshold; and the estimated cost comparison is based on a comparison between the plurality of estimated cost fields and the fixed cost threshold and the variable cost threshold of the cost rules; and
wherein the query held at the compiler is prevented from executing for a given time period, the time period including one of an off-peak period, a low priority period, and an indefinite period.

2. The DBMS of claim 1, wherein the compiler further comprises:
wherein the compiler is further to:
hold the query based on a determination that a first estimated cost field of the estimated resource execution cost exceeds the fixed cost threshold or based on a determination that a second estimated cost field of the estimated resource execution cost exceeds the variable cost threshold by a predetermined amount; and
write the query plan to a query repository of the DBMS based on a determination that the query has been held by the compiler.

3. The DBMS of claim 2, wherein the computer executable instructions further comprise a query executor to:
execute the query plan on a database stored in data storage based on a determination that the query is not held by the compiler; and
cancel and hold execution of the query based on a cost comparison between an actual resource execution cost for the query plan and the cost rules.

4. The DBMS of claim 1, wherein the compiler is further to provide a notification to a requestor of the query that the query has been held.

5. The DBMS of claim 1, wherein the computer executable instructions further comprise a cost control to notify a user that the query has been held, wherein the cost control comprises a query plan editor to edit the query plan to provide a modified query plan to the compiler.

6. The DBMS of claim 5, the compiler is further to perform another estimated cost comparison between an estimated resource execution cost of the modified query plan and the cost rules.

7. The DBMS of claim 6, wherein the compiler is further to prevent the modified query plan from executing based on results of the another estimated cost comparison.

8. The DBMS of claim 7, wherein the compiler is further to provide a notification to a requestor of the query that the query has been prevented from being completed.

9. The DBMS of claim 1, wherein a query requestor submits the query received at the query input such that the query requestor requests that the query be executed.

10. The DBMS of claim 1, wherein the query optimizer is to determine the estimated resource execution cost of the query plan prior to execution of the query.

11. The DBMS of claim 1, wherein the number of join operations includes at least one of a sort-merge join, a hash join, and a nested loop join.

12. The DBMS of claim 1, wherein the estimated resource execution cost of the query plan is further based on at least one of an index scan and a sequential scan in the query plan for the query.

13. A method for managing a database comprising:
generating a query plan for a received query;

estimating a resource execution cost of the query plan; and
determining whether to hold the received query based on the estimated resource execution cost of the query plan, where holding the received query prevents execution of the query for a given time period, the time period including one of an off-peak period, a low priority period, and an indefinite period;
notifying a requestor of the query that the query has been held;
editing the query plan to provide a modified query plan;
determining whether to prevent the query from executing based on an estimated resource execution cost of the modified query plan for the query.

14. The method of claim 13, further comprising:
holding the received query.

15. The method of claim 14, further comprising:
estimating a resource execution cost of the modified query plan; and
determining whether to execute the modified query plan based on the estimated resource execution cost of the modified query plan.

16. A database management system (DMBS) comprising:
a query repository comprising:
    cost rules that characterize a resource execution cost limit for a query plan;
    a hold queue to store an entry comprising a query plan; and
    a modified queue to store an entry comprising a modified query plan;
a query input to receive a query from a query requestor, wherein the query requestor requests the query to be executed;
a compiler comprising a query optimizer to generate a query plan for the query received at the query input, the compiler is to:
    determine whether to hold the query received at the query input, wherein the holding prevents the query received at the query input from executing based on a cost comparison between an estimated resource execution cost of the query plan and the cost rules of the query repository, wherein the query held at the compiler is prevented from executing for a given time period, the time period including one of an off-peak period, a low priority period, and an indefinite period; and
    write an entry into the hold queue of the query repository based on a determination that the query received at the query input has been held; a query executor comprising a monitor to monitor an actual execution resource cost of the query plan, the query executor to:
    execute the query plan on a database stored in data storage based on a determination that the query plan has not been held;
    determine whether to cancel and hold the query received at the query input, wherein the holding prevents the query from executing, based on a cost comparison between the actual resource execution cost of the query plan and the cost rules of the query repository; and
    write an entry into the hold queue of the query repository based on a determination that the query has been held; a cost control to:
    notify a user of the cost control that the entry has been written into the hold queue of the query repository;
    retrieve the entry from the hold queue of the query repository to provide a retrieved entry;
    provide a query plan editor for modifying the query plan of the retrieved entry to provide a modified query plan; and
    write an entry into the modified queue of the query repository that includes the modified query plan.

17. The DBMS of claim 16, wherein the compiler is further to:
perform another estimated cost comparison between an estimated resource execution cost of the modified query plan of the entry in the modified queue and the cost rules of the query repository; and
reject a query corresponding to the modified query plan of the entry in the modified queue, wherein the holding prevents the modified query plan of the entry in the modified queue from executing based on results of the another estimated cost comparison.

18. The DBMS claim 17, wherein the compiler is further to notify a query requestor of the query if the query is held or rejected.

19. A non-transitory computer readable medium having computer executable instructions comprising:
a compiler to determine whether to hold a query on a database based on an estimated resource execution cost of a query plan for the query, such that wherein holding the query prevents the query from being executed for a given time period, the time period including one of an off-peak period, a low priority period, and an indefinite period; and
a cost control to notify a requestor of the query that the query has been held, wherein the cost control comprises a query plan editor to edit the query plan to provide a modified query plan to the compiler;
wherein the compiler is further to determine whether to prevent the query from executing based on an estimated resource execution cost of the modified query plan for the query.

20. The non-transitory computer readable medium of claim 19, further comprising a query executor to determine whether to cancel and hold execution of the query based on an actual resource execution cost of the query plan for the query and cost rules.

21. The non-transitory computer readable medium of claim 19, further comprising a query executor to determine whether to cancel execution of the query based on an actual resource execution cost of the modified query plan for the query.

* * * * *

UNITED STATES PATENT AND TRADEMARK OFFICE
CERTIFICATE OF CORRECTION

| | |
|---|---|
| PATENT NO. | : 8,930,344 B2 |
| APPLICATION NO. | : 13/021051 |
| DATED | : January 6, 2015 |
| INVENTOR(S) | : Subbarao Kakarlamudi et al. |

It is certified that error appears in the above-identified patent and that said Letters Patent is hereby corrected as shown below:

In the claims

In column 9, line 63, in Claim 1, delete "query the" and insert -- query, wherein the --, therefor.

In column 11, line 22, in Claim 16, delete "DMBS" and insert -- DBMS --, therefor.

In column 12, line 27, in Claim 18, delete "DBMS claim" and insert -- DBMS of claim --, therefor.

Signed and Sealed this
Sixth Day of October, 2015

Michelle K. Lee
*Director of the United States Patent and Trademark Office*